United States Patent [19]
Takanishi et al.

[11] Patent Number: 5,797,642
[45] Date of Patent: Aug. 25, 1998

[54] LUGGAGE COMPARTMENT CONSTRUCTION

[75] Inventors: Toshiaki Takanishi; Yuzuru Kimura; Nobuhiko Hara; Shingo Katsura, all of Hamamatsu, Japan

[73] Assignee: Suzuki Motor Corporation, Hamamatsu, Japan

[21] Appl. No.: 713,744

[22] Filed: Sep. 13, 1996

[30] Foreign Application Priority Data

Jan. 23, 1996 [JP] Japan ................. 8-008804

[51] Int. Cl.⁶ .................................... B62D 43/06
[52] U.S. Cl. ............... 296/37.3; 296/37.2; 296/37.1; 224/42.12; 224/42.13; 206/304; 220/6; 220/7
[58] Field of Search ................. 296/37.1, 37.2, 296/37.3, 37.5, 37.8, 37.14; 224/282, 42.12, 42.13, 42.3; 206/304, 304.1, 304.2; 292/253, DIG. 17, DIG. 38; 220/692, 6, 7

[56] References Cited

U.S. PATENT DOCUMENTS 5,577,779  11/1996  Dangel ..................... 292/80

FOREIGN PATENT DOCUMENTS

| 3323560 | 10/1984 | Germany | 224/42.12 |
| 4320493 | 12/1994 | Germany | 224/42.13 |
| 64-1644 | 1/1989 | Japan | 296/37.8 |
| 6-247211 | 9/1994 | Japan | 296/37.2 |

*Primary Examiner*—Gary C. Hoge
*Assistant Examiner*—Jason Morrow
*Attorney, Agent, or Firm*—Bell Seltzer Intellectual Property Law Group of Alston & Bird LLP

[57] ABSTRACT

The present invention provides a luggage compartment construction comprising a spare tire house provided under a luggage compartment to contain a spare tire, a spare tire board for closing an opening of the spare tire house, and a back panel trim for covering a back panel member disposed at the lower rear part of the luggage compartment, in which a box-shaped storage portion, which is used as a container, is integrally formed at the lower part of the back panel trim by extending the lower part of the back panel trim to the lower rear side of the spare tire board and by bending the extended portion.

3 Claims, 8 Drawing Sheets

LUGGAGE COMPARTMENT CONSTRUCTION

FIELD OF THE INVENTION AND RELATED ART STATEMENT

The present invention relates to a luggage compartment construction applied to a four-wheeled automobile.

A luggage compartment (trunk room or luggage room) 51 for containing luggage has conventionally been provided at the rear part of a vehicle body of a four-wheeled automobile as shown in FIG. 15. Under the luggage compartment 51, a spare tire housing 53 for containing a spare tire 52 is provided, and at the rear thereof, a back panel member 55 covered by a back panel trim 54 is disposed. The back panel trim 54, which is used for protecting the back panel member 55 and improve the appearance, is made of a resin or nonwoven fabric.

On top of the spare tire housing 53 and in front of the back panel trim 54, a flat plate shaped spare tire board 56 and a floor carpet 57, which constitute a luggage floor, are arranged, and the opening of the spare tire housing 53 is closed by the spare tire board 56. Thus, the space over the spare tire board 56 and the floor carpet 57 is used as a trunk (luggage) space. In FIG. 15, reference numeral 58 denotes a rear floor panel, and 59 denotes a rear bumper.

In the above-described conventional luggage compartment construction, when luggage is contained in a space under the spare tire board 56, the space S located on the vehicle body rear side of the spare tire housing 53 can be used most easily as shown in FIG. 15. However, with this luggage compartment construction, if easily rollable luggage or small luggage is contained, it does not necessarily remain in the space S and is moved by the behavior of the automobile, so that the storage condition is unstable. To contain luggage in the space S, therefore, a box, which is a separate part, is required, leading to a high cost.

When the luggage is put into or taken out of the space S, the whole of the spare tire board 56 and the floor carpet 57 must be raised. Particularly when other luggage lies on the spare tire board 56 and the floor carpet 57, the spare tire board 56 and the floor carpet 57 must be raised together with the luggage, or when the luggage is heavy, it must be removed once, so that it is very inconvenient for luggage to be put into and taken out of the space S. With the conventional luggage compartment construction, therefore, it is difficult to use the rear space S of the spare tire housing 53.

On the other hand, a functionally necessary portion of the back panel trim 54 is a trim upper portion 54a, which is hit by luggage when it is put in and out, and other portions are necessary for appearance.

OBJECT AND SUMMARY OF THE INVENTION

The present invention was made in view of the above situation, and an object thereof is to provide a luggage compartment construction in which a space on the lower rear side of a spare tire board can be utilized easily without increasing the number of parts.

To solve the problem with the aforementioned prior art, the present invention provides a luggage compartment construction comprising a spare tire housing provided under a luggage compartment to contain a spare tire, a spare tire board for closing an opening of the spare tire housing, and a back panel trim for covering a back panel member disposed at the lower rear part of the luggage compartment, in which a box-shaped storage portion, which is used as a container, is integrally formed at the lower part of the back panel trim by extending the lower part of the back panel trim to the lower rear side of the spare tire board and by bending the extended portion.

As described above, in the luggage compartment construction in accordance with the present invention, comprising the spare tire housing provided under the luggage compartment to contain a spare tire, the spare tire board for closing an opening of the spare tire housing, and the back panel trim for covering the back panel member disposed at the lower rear part of the luggage compartment, the box-shaped storage portion, which is used as a container, is integrally formed at the lower part of the back panel trim by extending the lower part of the back panel trim to the lower rear side of the spare tire board and by bending the extended portion. Therefore, luggage can be contained surely with a simple construction without increasing the number of parts as compared with the conventional construction, the construction is advantageous in terms of cost as compared with the case where a box, which is a separate part, is used, and it is very convenient because a space on the lower rear side of the spare tire board can be utilized effectively.

DETAILED DESCRIPTION OF PREFERRED EMBODIMENTS

Figure 1:
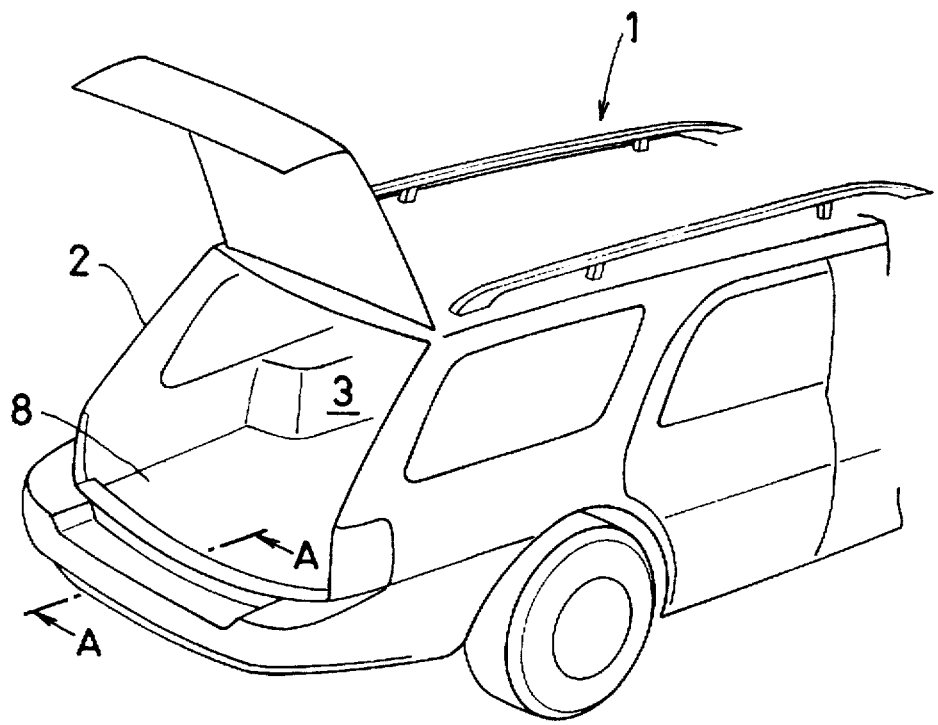
FIG. 1 is a perspective view showing a vehicle body rear portion of an automobile to which a luggage compartment construction in accordance with an embodiment of the present invention is applied.

The present invention will be described in detail with reference to embodiments shown in the drawings.

Figure 2:
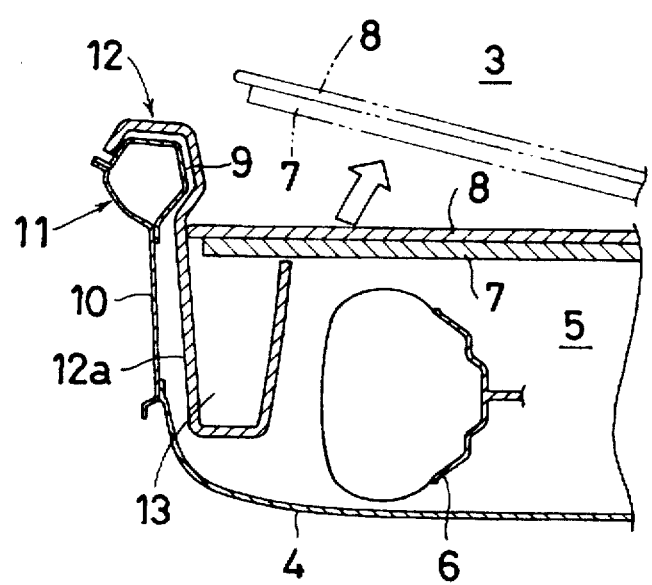
FIG. 2 is a sectional view taken along the line A—A of FIG. 1.

FIGS. 1 and 2 show an embodiment of a luggage compartment construction in accordance with the present invention. In these figures, reference numeral 1 denotes a four-wheeled automobile to which the luggage compartment construction of this embodiment is applied. A luggage compartment 3 for containing luggage is provided at a vehicle body rear portion 2 of the automobile 1. Under this luggage compartment 3 is disposed a spare tire housing 5, a concavity for attaching a spare tire, formed by depressing a floor panel 4 downward, and a spare tire 6 is contained in the spare tire housing 5. The spare tire 6 in the spare tire housing 5 is fixed to a bracket by means of a fastening screw, not shown.

Over the spare tire housing 5, a spare tire board 7 and the floor carpet 8 are arranged as shown in FIG. 2 so that an opening of the spare tire housing 5 is closed by the spare tire board 7. The spare tire board 7 is integrally molded into a flat plate shape by using resin etc.

On the other hand, a back panel member 11, consisting of an inner panel 9 and an outer panel 10 bonded to each other, is disposed at the lower rear part of the luggage compartment 3. The top and the compartment side of the back panel member 11 are covered by a back panel trim 12. The back panel trim 12, which is used mainly for protecting the back panel member 11 and also used for improving the appearance, is integrally molded by bending a resin plate material etc.

Under the back panel trim 12 is integrally formed a box-shaped storage portion 13 used as a container. This storage portion 13 is formed substantially into a U shape in cross section by extending the lower part 12a of the back panel trim 12 to the lower rear side of the spare tire board 7 and bending it at right angles toward the vehicle body front portion, and by further bending the extended portion upward.

With the luggage compartment construction of this embodiment, when luggage is put into or taken out of the storage portion 13 in the spare tire housing 5, the rear side of the floor carpet 8 and the spare tire board 7 are first raised as indicated by the chain line in FIG. 2. Then, the upper opening of the storage portion 13 is opened. This enables luggage to be put into the storage portion 13 of the back panel trim 12 or to be taken out of the storage portion 13.

In the luggage compartment construction of this embodiment, since the storage portion 13 is integrally formed at the lower part 12a of the back panel trim 12, luggage can be contained surely without increasing the number of parts as compared with the conventional construction, and a space located on the lower rear side of the spare tire board 7 can be utilized effectively.

Figure 3:
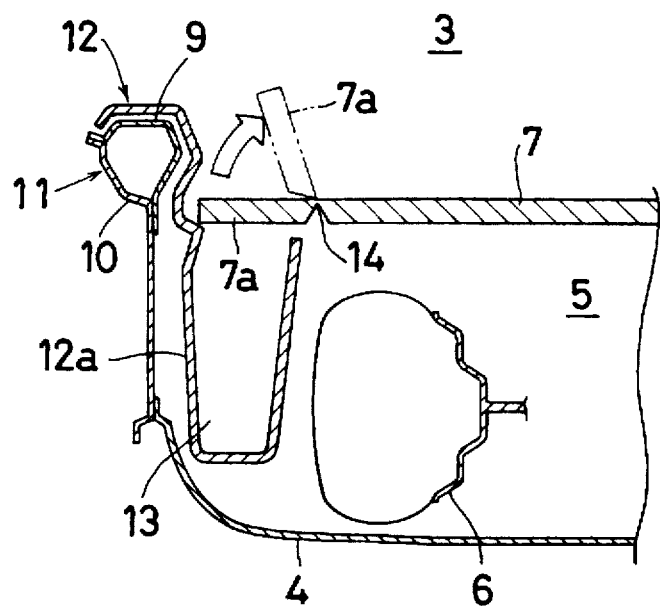
FIG. 3 is a sectional view showing the vicinity of a spare tire board used for a luggage compartment construction in which the above embodiment is improved.

FIG. 3 shows an improved embodiment of a luggage compartment construction in accordance with the present invention. In this figure, at the rear part 7a (vehicle body rear side) of the spare tire board 7, a hinge portion 14 formed thinner partially is integrally provided. Therefore, the spare tire board 7 is configured so that only the rear part 7a side thereof can be turned in the vertical direction around the hinge portion 14, and the rear part 7a functions as a cover for opening/closing the upside of the storage portion 13 of the back panel trim 12 located on the vehicle body rear side of the spare tire housing 5.

Since the spare tire board 7 of this embodiment is provided with the hinge portion 14 formed thinner partially at the rear part 7a, and is configured so that only the rear part 7a side thereof can be turned around the hinge portion 14, only the rear part 7a can be opened singly without the need to raise the entire of the spare tire board 7 or without the need to move or remove luggage regardless of the weight of luggage. Thereupon, the rear space of the spare tire housing 5 can be utilized more easily, and luggage can be put into and taken out of the storage portion 13 quickly with a minimum operation.

Figure 4:
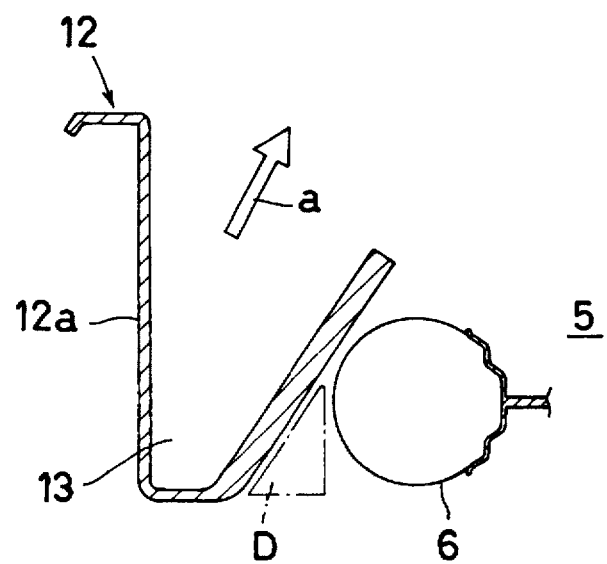
FIG. 4 is a sectional view for illustrating the mold drawing direction of a back panel trim used for the above mentioned luggage compartment construction.
Figure 5:
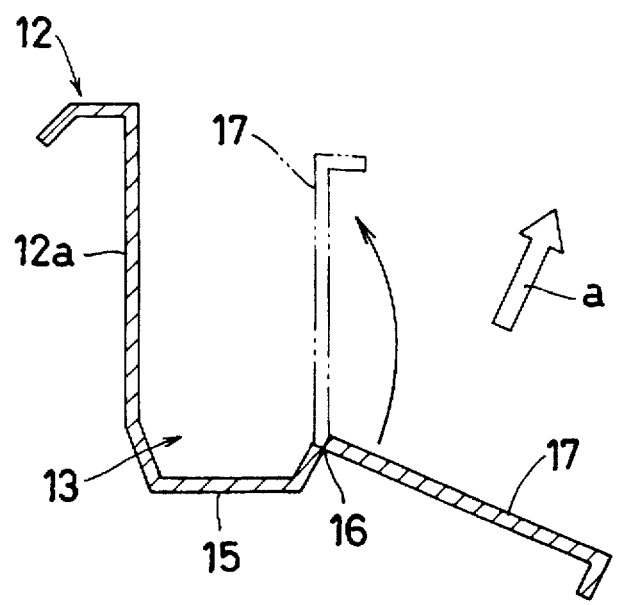
FIG. 5 is a sectional view showing a storage portion of a back panel trim used for a luggage compartment construction in which the above embodiment is improved.
Figure 6:
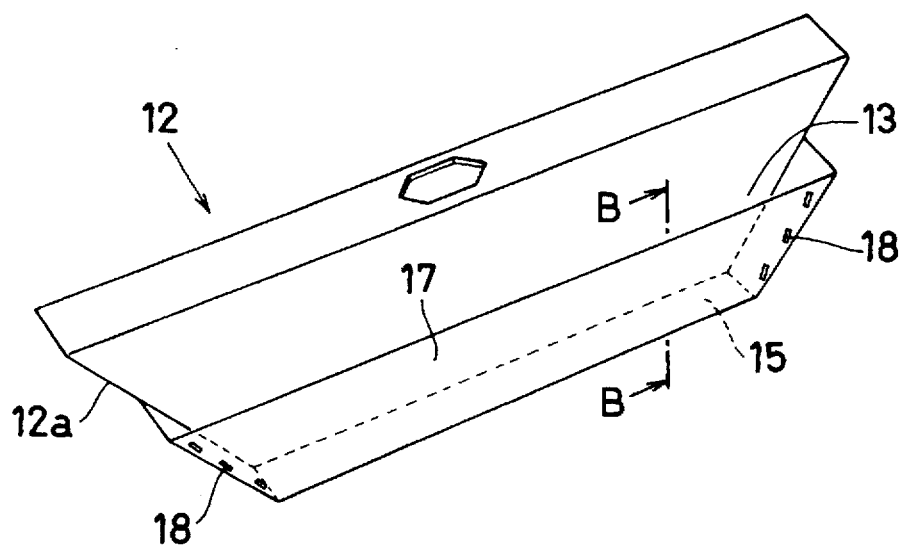
FIG. 6 is a perspective view showing a storage portion of the back panel trim shown in FIG. 5.
Figure 7:
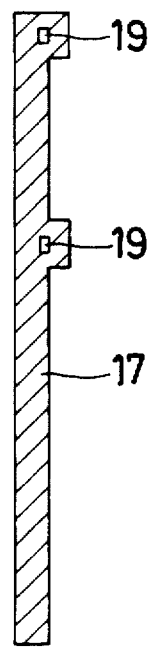
FIG. 7 is a sectional view taken along the line B—B of FIG. 6.

FIGS. 5 to 7 show a further improved embodiment of a luggage compartment construction in accordance with the present invention. The storage portion 13 in FIG. 4 is integrally molded by extending the lower part 12a of the back panel trim 12 to the lower rear side of the spare tire board 7 and bending it, and the mold drawing direction is as indicated by arrow a. Therefore, if the back panel trim 12 is integrally molded as it is, a front wall is arranged obliquely upward, so that the D portion of the rear space of the spare tire housing 5 cannot be utilized.

Thus, in the luggage compartment construction of this embodiment, as shown in FIG. 5, a part of the storage portion 13 of the back panel trim 12 is molded in an open manner leaving a thin-wall portion. Specifically, the storage portion 13 comprises a storage portion body 15 and a front wall 17 formed rotatably around the hinge portion 16. In order to assemble the storage portion 13, the front wall 17 is raised by turning the front wall 17 counterclockwise as indicated by the chain line in FIG. 5. The arrow a in FIG. 5 indicates the mold drawing direction of the back panel trim 12.

The front face of the storage portion body 15 is provided with locking holes (not shown), and locking claws 18 protrude from the rear surface of the front wall 17, so that the front wall 17 is attached to the storage portion body 15 by inserting the locking claws 18 into the locking holes (not shown), by which a process of welding etc. is eliminated. On the other hand, since the hinge portion 16 is straight, the front wall 17 has a large flat surface as shown in FIG. 6. To increase the stiffness of this portion, the front wall 17 is reinforced by forming by gas injection and passing gas channels in portions 19 shown in FIG. 7.

The storage portion 13 of this embodiment is so constructed that a part thereof is molded in an open manner leaving a thin-wall portion, the storage portion 13 comprises the storage portion body 15 and the front wall 17 formed rotatable around the hinge portion 16, and the front wall 17 is raised when being assembled, so that a large storage space can be obtained despite the fact that the storage portion 13 is formed integrally with the back panel trim 12. Also, since the front wall 17 of this embodiment is attached to the storage portion body 15 by inserting the locking claws 18 into the locking holes (not shown) in addition to the hinge portion 16, a welding process and fixing clip can be omitted, so that the cost can be decreased by reducing the work man-hour and the number of parts.

Figure 8:
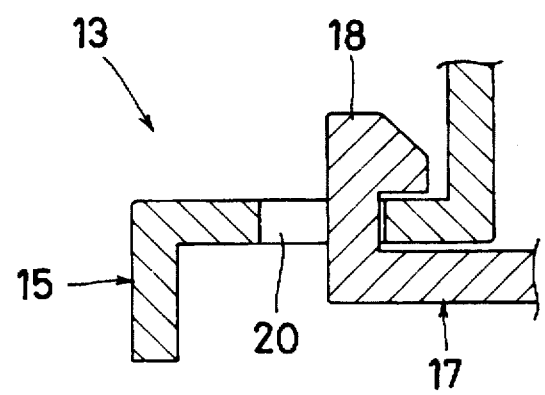
FIG. 8 is a sectional view showing a state in which a locking claw of a front wall, used for the luggage compartment construction of the above embodiment, is inserted into a locking hole of a storage portion body.
Figure 9:
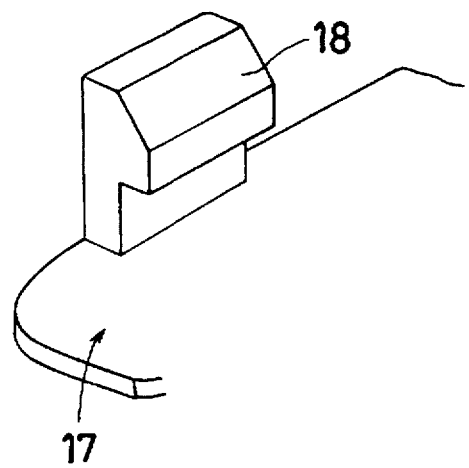
FIG. 9 is a perspective view showing the locking claw of the front wall shown in FIG. 8.
Figure 10:
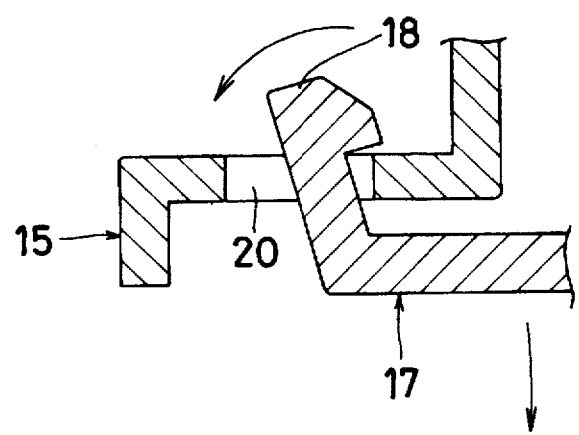
FIG. 10 is a sectional view showing the locking claw when a force is applied to the front wall shown in FIG. 8.

FIGS. 11 to 14 show a further improved embodiment of a luggage compartment construction in accordance with the present invention. The storage portion 13 shown in FIGS. 8 to 10 is assembled by inserting the locking claws 18 into the mating locking holes 20 to attach the front wall 17 to the storage portion body 15. However, since the locking claws 18 are formed so as to protrude to one side only as shown in FIGS. 8 and 9, if a force is applied to the vehicle body front, for example, when the storage portion 13 is packed with luggage, the locking claw 18 is tilted as shown in FIG. 10 and comes off from the locking hole 20, so that the front wall 17 is removed from the storage portion body 15, and therefore the storage portion does not function as a container for small articles.

Figure 11:
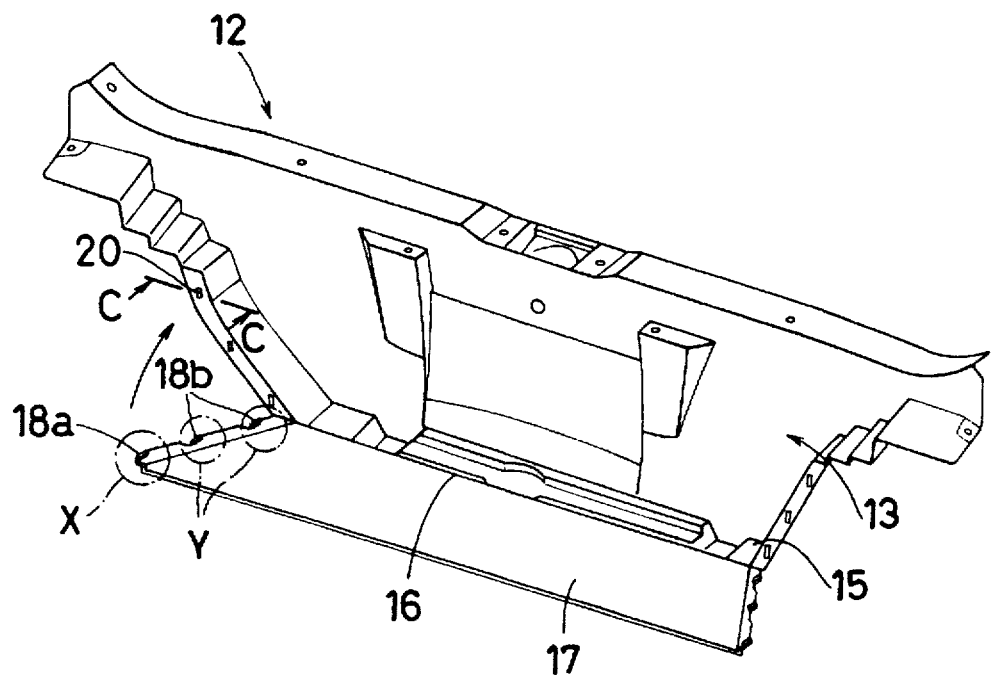
FIG. 11 is a perspective view showing a state before a front wall is attached to a storage portion body, in the storage portion used for a luggage compartment construction in which the above embodiment is further improved.
Figure 12:
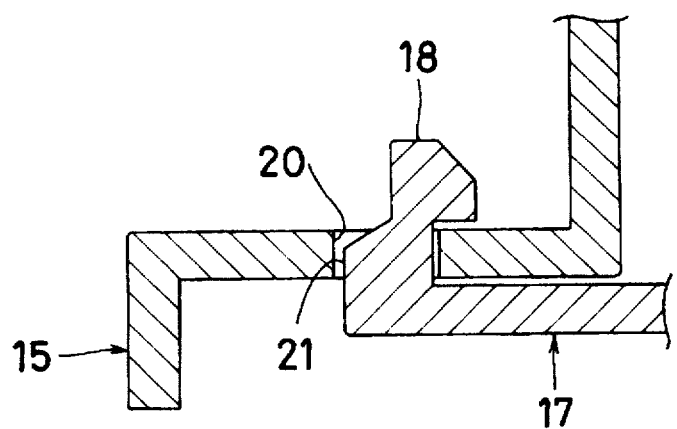
FIG. 12 is a sectional view taken along the line C—C of FIG. 11 in a state in which the storage portion is assembled.
Figure 13:
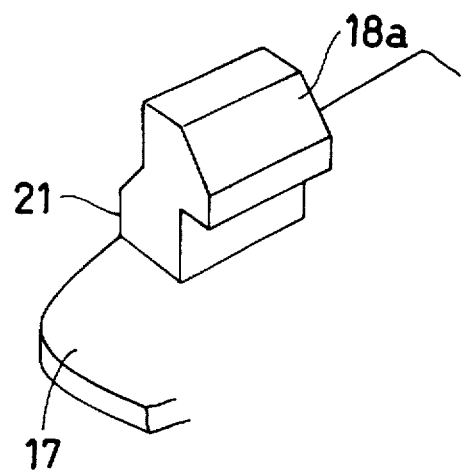
FIG. 13 is an enlarged perspective view of X portion in FIG. 11.
Figure 14:
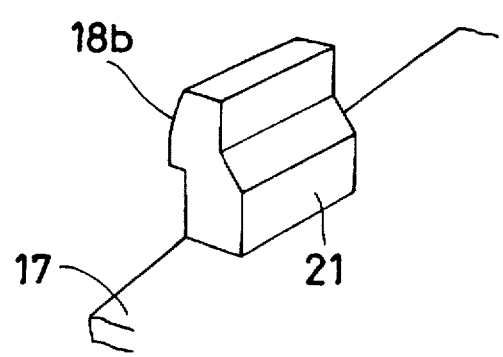
FIG. 14 is an enlarged perspective view of Y portion in FIG. 11.
Figure 15:
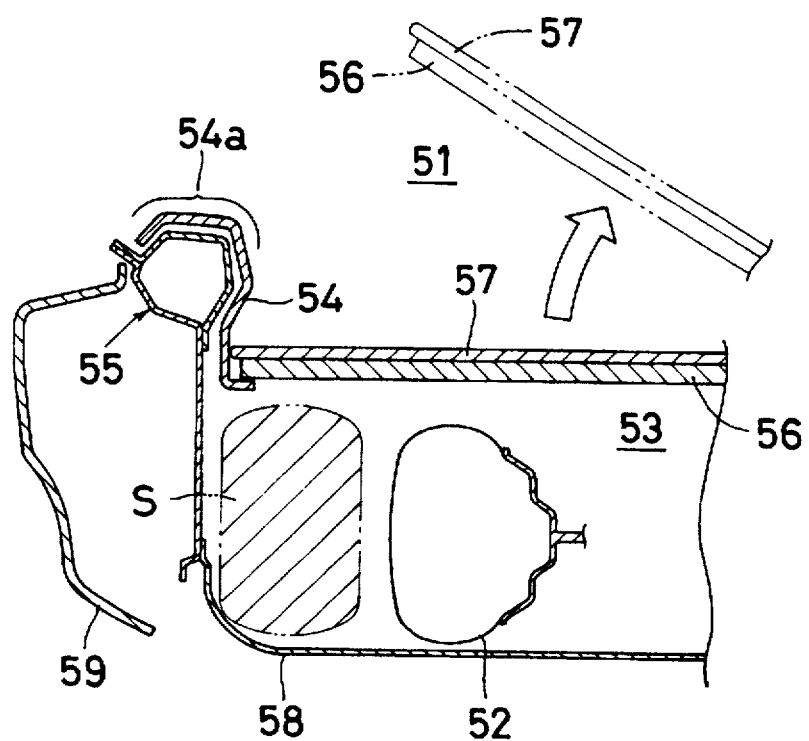
FIG. 15 is a sectional illustrating aspects of related prior art luggage compartment constructions by showing a state in which a spare tire board etc. are arranged over a spare tire housing etc.

Thus, in the luggage compartment construction of this embodiment, a protrusion 21 is provided at the root of the locking claw 18 as shown in FIGS. 11 and 12. The protrusion 21 is formed so as to protrude to the side opposite to the protruding direction (extending direction) of the locking claw 18, so that the protrusion 21 engages with the locking hole 20 when the locking claw 18 is inserted, and there is no gap between the protrusion 21 and the locking hole 20. A plurality of locking claws 18 are provided at both sides on the rear surface of the front wall 17, and a plurality of corresponding locking holes 20 are provided at both sides on the front face of the storage portion body 15. The locking claws 18 are arranged at predetermined intervals in the vertical direction so that the protruding directions of the upper and lower locking claws 18a and 18b are different from each other as shown in FIGS. 11, 13, and 14. The combination of the protruding directions of the locking claws 18 may be changed according to the vehicle type, or the protruding directions of the locking claws 18 may be different between the right and the left.

In the luggage compartment construction of this embodiment, since the protrusion 21 is provided at the root of the locking claw 18 so as to protrude to the side opposite to the protruding direction of the locking claw 18, the locking claw 18 can be engaged with the mating locking hole 20 without a gap between them, so that even if a force is applied to the vehicle body front, the locking claw 18 is not tilted, and does not come off from the locking hole 20, and therefore the storage portion 13 can maintain the function as a container for small articles. Moreover, since the locking claws 18 are arranged so that the protruding directions of the upper and lower locking claws 18a and 18b are different from each other, the locking claw never comes off, and therefore the front wall 17 is never removed from the storage portion body 15. Also, since the storage portion 13 of this embodiment has a simple construction such as to be assembled by using locking claws 18 having the protrusion 21 and the locking holes 20, this construction requires no clip etc., and is advantageous in terms of cost without increasing the number of parts.

Although the embodiments of the present invention have been described above, the present invention is not limited to the above-described embodiments. Various changes and modifications may be made based on the technical concept of the present invention.

We claim:

1. A luggage compartment construction, comprising:

a luggage compartment having a floor;

a spare tire housing underneath said luggage compartment and defined by a depression in said luggage compartment floor, said spare tire housing having an opening at the top thereof;

a spare tire housing cover covering said opening and defining a portion of said luggage compartment floor;

a back panel member disposed at a lower rear portion of said luggage compartment;

a back panel trim member covering the interior surface of said back panel member, said back panel trim member having an end portion extending into said spare tire housing, said end portion being substantially U-shaped to thereby define front and rear walls of a storage compartment body, said storage compartment comprising, a hinge portion pivotally connecting said front wall to said storage compartment body; and at least one of a locking claw and a locking hole being provided on said front wall, and a cooperating one of said locking claw and locking hole being provided on said storage compartment body to secure said front wall to said storage compartment body.

2. A luggage compartment construction according to claim 1, wherein a protrusion is provided at the root of said locking claw so as to protrude to the side opposite to the protruding direction of said locking claw and engage with said locking hole.

3. A luggage compartment construction according to claim 2, wherein a plurality of said locking claws are arranged in the vertical direction so that the protruding directions of the upper and lower locking claws are different from each other.

* * * * *